US012781613B2

(12) United States Patent
Fornero et al.

(10) Patent No.: US 12,781,613 B2
(45) Date of Patent: Nov. 3, 2026

(54) METHOD FOR DEFINING BOREHOLE WALL IMAGE PROFILES FROM GEOLOGICAL OUTCROPS PHOTOGRAPHS

(71) Applicant: PETRÓLEO BRASILEIRO S.A. - PETROBRAS, Rio de Janeiro (BR)

(72) Inventors: Sofia Alves Fornero, Rio de Janeiro (BR); Candida Menezes De Jesus, Rio de Janeiro (BR); Pamella Paiva Fernandes, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 166 days.

(21) Appl. No.: 18/666,453

(22) Filed: May 16, 2024

(65) Prior Publication Data

US 2024/0392678 A1 Nov. 28, 2024

(30) Foreign Application Priority Data

May 23, 2023 (BR) .......................... 1020230099297

(51) Int. Cl.

*E21B 47/002* (2012.01)
*G06T 3/60* (2006.01)
*G06T 7/62* (2017.01)

(52) U.S. Cl.

CPC ............ *E21B 47/0025* (2020.05); *G06T 3/60* (2013.01); *G06T 7/62* (2017.01); *G06T 2207/20132* (2013.01)

(58) Field of Classification Search

CPC ......... E21B 47/0025; G06T 7/62; G06T 3/60; G06T 2207/20132

See application file for complete search history.

(56) References Cited

U.S. PATENT DOCUMENTS

2007/0239359 A1* 10/2007 Stelting ..................... A61P 9/00 702/6
2008/0059075 A1* 3/2008 Colombo ............... G01V 11/00 702/18
2023/0135710 A1* 5/2023 Alqattan .............. G01B 11/272 382/100

FOREIGN PATENT DOCUMENTS

BR 9606077 A 9/1998
CA 3019124 A1 10/2017

(Continued)

OTHER PUBLICATIONS

Prensky, Advances in borehole imaging technology and applications. Borehole Imaging: applications and case histories. Geological Society, London, Lovell, M.A. (Ed.). vol. 159, pp. 1-43, (1999).

*Primary Examiner* — Abdallah Abulaban

(74) *Attorney, Agent, or Firm* — McCarter & English, LLP; Wei Song

(57) ABSTRACT

The present invention relates to a method for defining borehole wall image profiles from geological outcrops photographs. The objectives of the present invention are related to the creation of a planar projection of a pseudocylinder originating from longitudinal 2D images of geological outcrops available photographs. By means of the present invention, said created projection can be used by specific intelligence mechanisms, with pseudo image profiles being obtained for correlation with real image profiles. This said solution, unlike the prior art, allows that pseudo image profiles to be obtained at a low cost.

20 Claims, 4 Drawing Sheets
(4 of 4 Drawing Sheet(s) Filed in Color)

(56) References Cited

FOREIGN PATENT DOCUMENTS

| | | | |
|---|---|---|---|
| CN | 112307803 | A | 2/2021 |
| WO | 2015/148666 | A1 | 10/2015 |

* cited by examiner

METHOD FOR DEFINING BOREHOLE WALL IMAGE PROFILES FROM GEOLOGICAL OUTCROPS PHOTOGRAPHS

RELATED APPLICATIONS

This application claims the benefit of Brazilian Patent Application No. BR 10 2023 0099297, filed May 23, 2023, the entire contents of which are explicitly incorporated by referenced herein.

FIELD

The present invention falls within the field of the borehole wall imaging technologies, specifically in the field of means for processing images capable of analyzing geological structures, whether for oil prospecting, geothermal or subsurface rock studies, wherein its recognition is considered indirectly through geometric characteristics and textural contrasts.

STATE OF THE ART

Geological structures visualized in the borehole wall image profiles, whether for oil prospecting, geothermal or subsurface rock studies, are recognized indirectly by their geometries and textural contrasts. Sometimes, boreholes exclusively for rock studies are drilled in outcrops at high costs and profiled with the aim of recording analogous structures in geophysical profiles.

The interpretation of geological structures in the image profiles is commonly done through visual comparison with photographic images of geological structures in known rock outcrops, and its accuracy depends on the interpreter's experience in recognizing these rock structural features and understanding the different geometries present in the cylindrical borehole sections and in the flat outcrop sections. Validation, that is, confirmation of this interpretation, can be carried out by visual comparison of these profiles with a photographic image or the 360° tomographic profile of the rock core cylinder of the borehole wall at the same depth. In the last decade, computational advances have made it possible to carry out this comparison virtually, in the same graphical interface wherein the image profiles are interpreted, allowing the borehole wall image profile and the image of the rock core, according to document WO 2015/148666 A1. However, due to the high cost, rock cores are not acquired in all boreholes, nor throughout the entire area of interest. Therefore, interpretation methods based on image profiles were created, such as the creation of pseudo core samples that can be used in the preparation of stratigraphic models according to document US 2007/0239359 A1. This method of creating pseudo core from borehole wall image profiles utilizes the interpretation validated by the core on the remainder of the wall that was not cored. Although the certainty degree in the interpretation of structures where there is no core is lower, the method has proven to be well used, since the interpreter has in hand a visual rock-profile calibration for the type of rock being investigated.

Recently, also for investigative purposes in the oil and gas field, images of outcrops have been digitized to extract fracture segments and study them at different observation scales, according to document CN112307803A.

All these works have the purpose of improving the geological and petrophysical interpretation of the rock formation under investigation in image profiles, but still, the interpreting geologist or geophysicist faces difficulties in recognizing some geological structures in borehole wall image profiles mainly because: (1) there is not always a rock core for visual calibration and, consequently, there is no possibility of applying the method according to WO 2015/148666 A1; (2) when there is a rock core, it has a partial representation of the borehole, and the rest of the zone of interest that only has image profiles is without rock×profile calibration; and (3) the most used method, which is based on visual comparison in the search for similarities between geological features and photos of rocky outcrops, does not consider the geometric distortions existing between the two types of image (longitudinal×flat projection of a cylinder) and does not represents the ideal geometry for comparison.

Additionally, the state of the art comprises document BR9606077A which describes a method for acquiring and digitally processing images of geological outcrops, with the aim of minimizing the distortions that normally occur when tracking their lithofaciological and architectural elements through manual processes, based on extensive mosaics on photographic paper. This method involves terrestrial photogrammetry, digital image processing and geoprocessing techniques, in an integrated manner, which allows the analysis of these outcrops to be carried out with the maximum resolution and with the minimum possible distortion. However, it is clear that in the aforementioned document BR9606077A no description is presented in order to achieve a set of steps that allow pseudo borehole wall image profiles to be obtained from geological outcrops photographs.

Furthermore, the prior art comprises document CA3019124C which describes enabling automatic descriptions of cores. In particular, CA3019124C refers to core samples as a piece of rock (e.g., for example, cylindrical in shape and of varying lengths) including one or more lithofacies extracted from a borehole beneath the earth's surface that provides actual/accurate physical evidence of reservoir formation characteristics, for example, rock type, formation thickness, grain size, or permeability. Core description is mentioned as a fundamental task in reservoir characterization for predicting borehole properties and typically includes descriptions of bedding, lithology, sedimentary structures, fossils, and any other micro/macro-features of rocks In this sense, CA3019124C describes that automated core description uses conventional borehole logs which do not include image logs such as borehole images in combination with computational intelligence (CI) techniques Although CA3019124C is in a similar technical field to that of the invention, CA3019124C does not identify a set of steps programmed in the present invention, such that it is associated with achieving pseudo borehole wall image profiles from geological outcrops photographs.

The present invention solves the interpreter's search for quality visual analogues when needing to interpret facies based on geometric similarities of features, as it provides a way to use images of rocky outcrops with structures recognized in geological studies in geometric proportions similar to a flat projection of a cylindrical profile, digitized and in the same color scale in which the borehole wall image profiles are interpreted. This method also has advantages due to its low cost and the possibility of obtaining multiple exemplary images for machine learning with the aim of developing geological pattern recognition methods. Also, catalogs of image pseudo profiles can be created and utilized in petrophysics software and stratigraphy to support the interpreter during the interpretation of image profiles, offering robustness for geological modeling.

BRIEF DESCRIPTION

The present invention relates to a method for defining borehole wall image profiles from geological outcrops photographs. The objectives of the present invention are related to the creation of a planar projection of a pseudocylinder originating from longitudinal 2D images of geological outcrops available photographs. By means of the present invention, said created projection can be used by specific intelligence mechanisms, with pseudo image profiles being obtained for correlation with real image profiles. This said solution, unlike the prior art, allows that pseudo image profiles to be obtained at a low cost.

More specifically, in the preferred embodiment of the present invention, a method for defining borehole wall image profiles from geological outcrops photographs is described, which comprises the steps of: Step a) Selecting a geological outcrop photographic image; Step b) Cropping the geological outcrop photographic image; Step c) Duplicating and inverting the photographic image crop of the geological outcrop; Step d) Joining the original crop to the inverted cutout; Step e) Saving the new constructed image; and Step f) Applying geophysical profile analysis.

Said selection of the geological outcrop photographic image in Step a) comprises determining the base photographic image which longitudinal section of a photographic crop on this base image will be transformed into a flat projection of a cylindrical pseudo profile. Additionally, the selection of the geological outcrop photographic image in Step a) preferably occurs with the image presenting the expected dimensions of an outcrop photo crop for comparison with the borehole wall. Also, the selection of the geological outcrop photographic image in Step a) preferably occurs with photographs of geological outcrop in which the geological structures under investigation are visible to the naked eye on a computer display. Additionally, the selection of the geological outcrop photographic image from Step a) preferably occurs with the scale of the photo (15) known so that a crop of precise size and known dimensions can be made. Finally, the selection of the geological outcrop photographic image from Step a) preferably occurs with the resolution being greater than 120 dpi.

Particularly, the cropping referred to in Step b) is carried out using a commercially available program of image visualization or vector illustration graphic design; the aforementioned crop presenting a width relative to half the perimeter of the wall of the borehole investigated.

Meanwhile, in Step c) of duplicating and inverting the cropping of the photograph of the geological outcrop, the sides of the image on the transverse axis are duplicated and inverted, mirroring the image of the original cropping (23).

In Step d), the union of the original crop with the mirrored crop is carried out from left to right or from right to left, achieving a flat projection of a cylindrical pseudo profile (24).

In turn, in Step e) the image obtained in Step d) is saved in digital formats jpg, tif, png, or other available digital format.

Sequentially, in Step f) the image saved from Step e) is loaded into a commercially available geophysical profile analysis intelligence mechanism, such that it preferably has a module that converts the plane projection figure of the pseudocylinder (33) into arrays with RGB values (34); wherein the image of the pseudocylinder converted into array of values (34) in Step f) is capable of being recognized in intelligence mechanisms that have the capacity for petrophysical interpretation, by presenting the same format as an image profile, as well as being capable of be displayed with the same color scale and be rotated horizontally, in relation to the position of the cylinder you want to observe, between 0 and 360° (36).

BRIEF DESCRIPTION OF THE DRAWINGS

The patent or application file contains at least one drawing executed in color. Copies of this patent or patent application publication with color drawing(s) will be provided by the Office upon request of the necessary fees.

DETAILED DESCRIPTION

Figure 1:
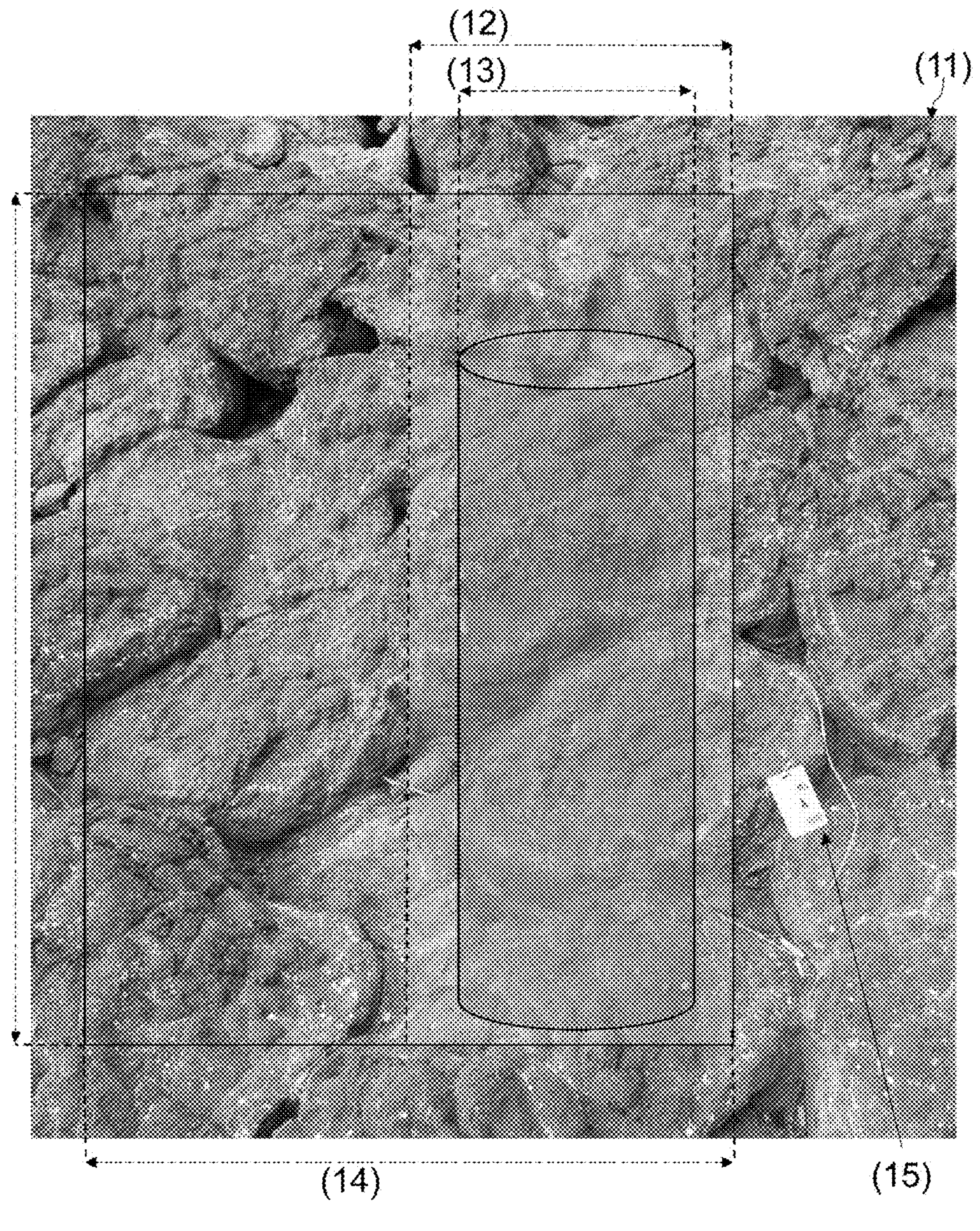
FIG. 1 is a graphic representation of a selection of a crop in outcrop photo with the desirable dimensions to be correlated with image profiles obtained in boreholes with a diameter equal to 31.115 cm (12.25 in).

The present invention relates to a method for defining borehole wall image profiles from geological outcrops photographs. The objectives of the present invention are related to the creation of a planar projection of a pseudocylinder originating from longitudinal 2D images of geological outcrops available photographs. By means of the present invention, said created projection can be used by specific intelligence mechanisms, such as software with pseudo image profiles being obtained for correlation with real image profiles. This said solution, unlike the prior art, allows that pseudo image profiles to be obtained at a low cost.

For information, high-resolution borehole wall image profiles are generated from a high density of electrical or acoustic data (Prensky, Stephen E. 1999. *"Advances in Borehole Imaging Technology and Applications". Geological Society*, London, Special Publications 159 (1): 1-43). These profiles are recorded by logging tools along the inner surface of the cylindrical borehole wall, and the data is viewed, by default, through the flat projection of the cylindrical borehole wall. The geological formation is sampled horizontally and vertically in small continuous areas of the borehole wall in order to form a dense matrix of measurements (Rider, M. (1996). *Image Logs. Em* M. Rider, *The Geological interpretation of well logs* (pp. 199225)). These are profiles widely used in the oil industry and in other subsurface geological research.

Specifically in the present invention, with the aim of achieving images of geological structures that can be compared with high-resolution borehole wall image profiles, it is proposed to use longitudinal crops of geological outcrops photographs with a fixed size width and a height that can vary in size.

It should be noted, in detail, that the preferred width defined in the present invention is fixed to meet the perimeter size relative to the diameter of the borehole in which the geological features will be viewed for comparison. High-resolution borehole imaging tools are typically used in wells measuring 31.115 cm, 21.59 cm, and 15.24 cm in diameter (12.25, 8.5, and 6 in). On the other hand, there is no preferred height defined in the present invention as the actual acquisition of borehole wall image profiles is done continuously, vertically, without restrictions. The important thing for comparison is that the geological structure in the photo of the outcrop is visible in the longitudinal section taken from the original photograph.

To this end, more specifically, it is observed that the method for defining borehole wall image profiles from geological outcrops photographs, as described in the present invention, comprises, at least, the steps of:

Step a) Selecting a geological outcrop photographic image;

Step b) Cropping the geological outcrop photographic image;

Step c) Duplicating and inverting the cropping of the geological outcrop photographic image;

Step d) Joining the original crop to the inverted crop;

Step e) Saving the new constructed image; and

Step f) Applying geophysical profile analysis.

In step a) of the present invention, a geological outcrop photographic image is selected as the basis for the transformation: from a longitudinal section of the photographic crop into a flat projection of a cylindrical pseudo profile. Therefore, preferably, the selection of the geological outcrop photographic image must meet the following requirements:

i) the image must present the expected dimensions of an outcrop photo section for comparison with the borehole wall. To contribute to the perfect description of the invention, FIG. 1 exemplifies a borehole with a diameter equal to 31.115 cm (12.25 in) (13). In this case, the perimeter is equal to 97.7 cm (14) and the image of the geological outcrop (11) should allow a longitudinal crop (12) of approximately half the perimeter of the borehole, in this case, approximately 48.8 cm wide, and height that can be variable. This requirement is not limited to a borehole with a diameter equal to that exemplified, and longitudinal crops with sizes that will represent the borehole of other diameters can be used. The photo of the outcrop shows, as an example, an igneous rock with Pillow Lava structures found in Aci Castello, Sicily—Italy. The height of the longitudinal crop in FIG. 1 is 117 cm, but it should be noted that the height can be variable. Preferably, a minimum of 1.0 m is recommended to facilitate viewing through a digital device, such as a computer;

ii) the geological structures under investigation must be visible to the naked eye. It is recommended that, on a computer display, the structure is visible in a size smaller than 147×102 mm (¼ A4 sheet);

iii) the scale of the photo (15) must be known so that a precise size crop can be made with the dimensions described in i);

iv) the resolution must be greater than 120 dpi to avoid generating low-resolution images later in the digital transformation of the data.

Figure 2:
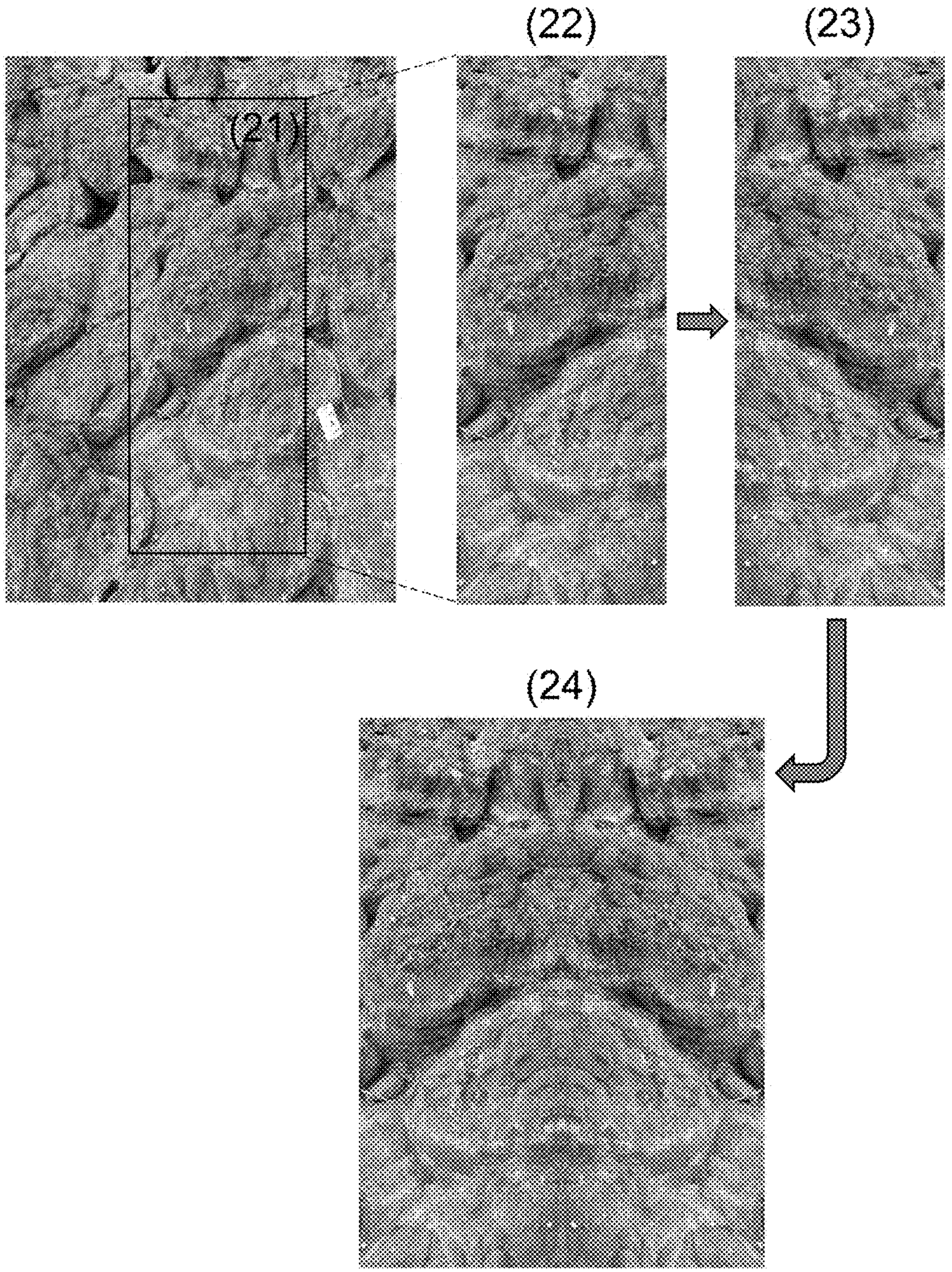
FIG. 2 is a graphic representation of an outcrop cut being transformed into a flat projection of a pseudocylinder.

In Step b) the crop of the geological outcrop photograph carried out. To achieve this crop, a commercially available image visualization or vector illustration graphic design program can be used, such as WordPad®, CorelDRAW® or PowerPoint®. The crop must have a width relative to half the perimeter of the wall of the borehole investigated. In FIG. 2 it can be seen that the crop (22) is the image of (21) expanded.

In Step c) of duplicating and inverting the cropping of the photograph of the geological outcrop, the sides of the image on the transverse axis are duplicated, mirroring the image of the original cropping (23).

Figure 3:
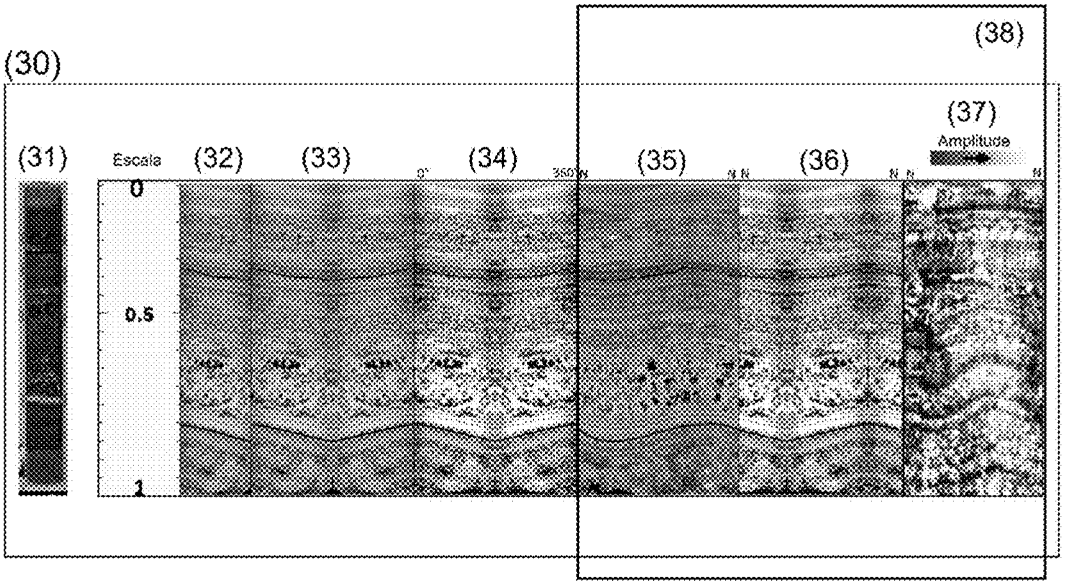
FIG. 3 is a presentation of a verification of the present invention method with tomographic profiles of carbonatic rock core.

For informational purposes, it is mentioned that the presented image mirroring technique was verified with tomographic profiles of limestone rocks, as shown in table (30) of FIG. 3. It was possible to attest that the longitudinal tomographic image (32), relating to the crop of the rock core (31), when joined to its mirror (33), presents a similar geometry to the image of the tomographic profile coming from the cylinder core (35). The similarity can be verified by comparing (35) and (36). This verification confirms that it is possible to create an image of a flat projection of a pseudo-cylinder (33) from rock images seen in a 2D, longitudinal session (32). This image presents geometry similar to that of the rock structures, if they came from the wall of a borehole.

In Step d) of joining the original crop with the mirrored crop, said union is carried out from left to right or from right to left, forming a flat projection of a cylindrical pseudo profile (24).

In Step e) of saving the new constructed image, the image can be saved in jpg, tif, png, or other available digital formats. The image saved in this Step e) is, therefore, the flat projection of a cylindrical pseudo profile (24) obtained in Step d).

In Step f) of applying geophysical profile analysis, it occurs that: after obtaining the image of the pseudocylinder flat projection (33) from the longitudinal tomographic profile (32), as per Step d) and Step e), the data is now ((Step f)) loaded into a specific geophysical profile analysis intelligence mechanism, as a commercially available example, Techlog® software can be cited. The intelligence mechanism must preferably have a module that converts the plane projection figure of the pseudocylinder (33) into matrices with RGB values (34). RGB is the color system used to represent colors in electronic devices. The matrix must contain the same number of pixels relative to the width of the input image or so that the user can choose the number of pixels. Tests were carried out with a data array of 180 horizontal pixels every 5 mm of vertical distance (34) and (36), which meets what is necessary to honor the scale of the photographic image, transformed into a array of values, on a computer display.

The image of the pseudocylinder, now converted into a array of values (34) in Step f), can be recognized in any intelligence mechanism, such as software, that has petrophysical interpretation capacity, as it will have the same format as an image profile and it can be viewed with the same color scale and rotated horizontally, in relation to the position of the cylinder you want to observe, that is, between 0 and 360° (36).

Horizontal rotation, between the 0-360° axis of the pseudocylinder, can be carried out so that geological features can be viewed at different angles, and can be carried out using petrophysical application software. In the case shown in FIG. 3, the pseudo image profile (36) together with the tomographic profile of the rock core cylinder (35) were oriented to be in the same position as the real image profile of the same depth (37), to better visual comparison of structures (38). To carry out this horizontal movement of the pseudocylinder, a fictitious orientation curve must be created, which will play the role of the azimuth curve of pad 1 (orientation curve for data acquisition of real image profiles, also called Pad1-Azimuth, required for viewing image profiles oriented relative to Earth's magnetic north). This curve will be used as a reference for positioning the data, as with the real image profile when loaded into the software. The guidance dummy curve can be created with a value of zero (0), for example, with vertical sampling equal to the pseudo-cylinder image or at the default sampling of 0.1524 cm (0.5 ft). Rotating the image around its horizontal axis can be used to choose a position that best characterizes the geological structure that will be used for comparison with the real image profiles.

The images of the image pseudo profiles obtained can be used to compose catalogs for private or collective use, in addition to serving as input data in stratigraphic, petrophysical, geological and machine learning modeling programs for pattern recognition.

Examples of the Invention Embodiments

Tests were carried out using photos of igneous rocks outcrops and siliciclastic rocks. The igneous rock outcrop (40) in FIG. 1 comes from the city of Aci Castello, Sicily—Italy, which presents "cushion" structures related to lava deposits in an underwater environment, classically called pillow lavas. The siliciclastic rock outcrop (41) in FIG. 4 is a polymictic conglomerate that presents imbricated clasts.

Figure 4:
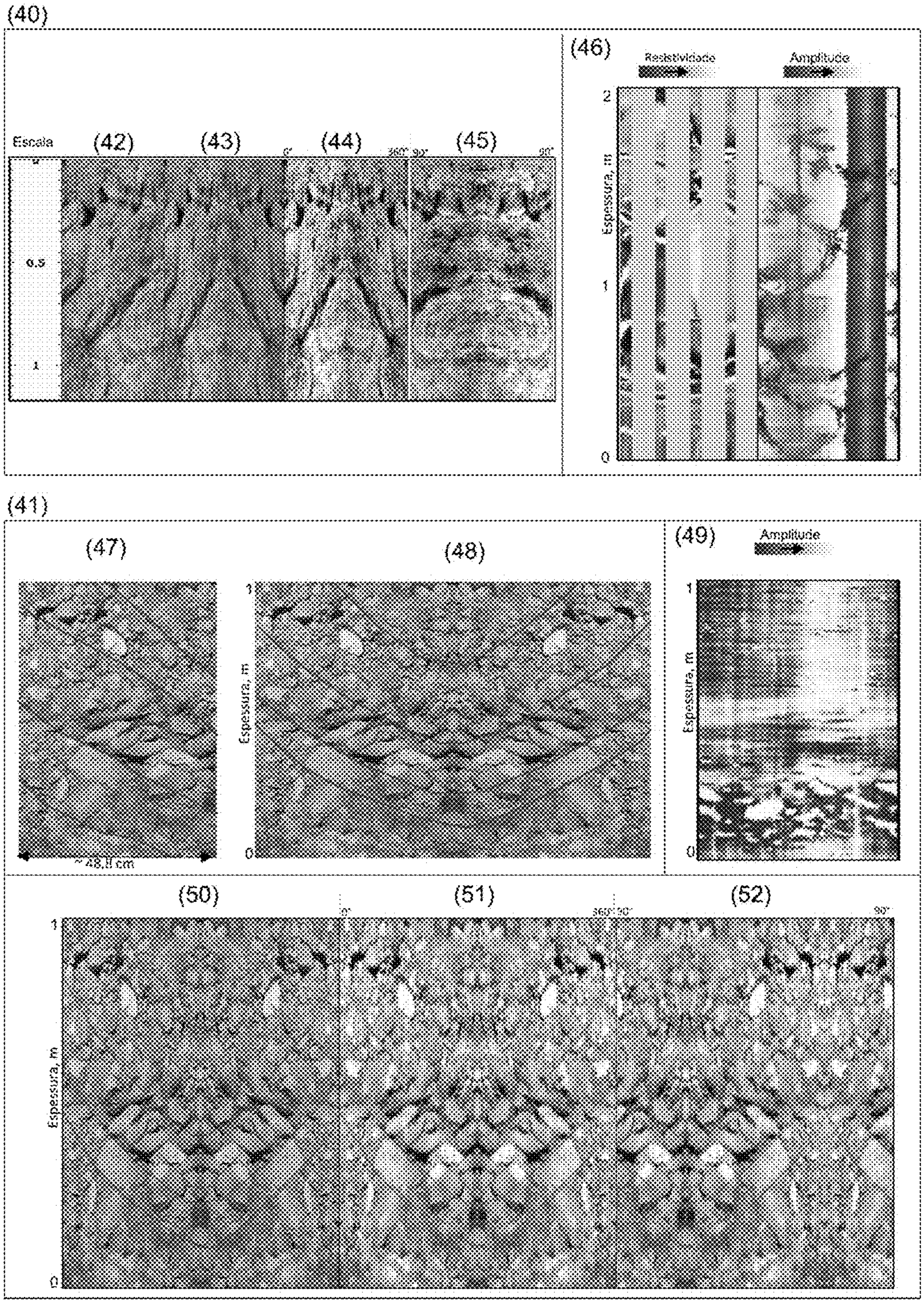
FIG. 4 is a representation of outcrop images viewed throughout the application of the method steps of the invention and compared with actual image profiles.

The results were surprising in the case of the pillow lava outcrop (40) in FIG. 4, when the geological structures are larger than the perimeter of the cylindrical borehole wall. The geometric appearance of the edges of this structure in the flat projection of the pseudocylinder (43) is very different from what is seen in the outcrop section and similar to what is seen in real image profiles on the borehole wall (46).

The results obtained with the pseudo image profile generated with the imbricated clasts of the polymictic conglomerate (41) in FIG. 4 are also of great use, as it makes clear what the visual effect of this deposition will be on the real image profiles (49). In case (41) of FIG. 4, the interpretation of the actual image profile (49) could have been breccia deposits from scattered clasts. However, when observing the image pseudo profiles (51 or 52), which come from the outcrop photo (47) and the flat projection of its pseudocylinder (48 and 50), this interpretation is corrected for imbricated clasts. Geologically, clast imbrication information is essential to investigate the direction of supply of sedimentary deposits. This direction can be studied by analogy using the pseudoprofile rotated transversely around its longitudinal axis (52).

Other tests were carried out, for example, on breccia deposits with clasts at least five times smaller than the perimeter of the borehole cylinder and without apparent stratification. In this case, the mirroring result did not show major changes in the apparent geometry of the structures. In these cases, mirroring the image was not necessary and the photograph of the geological outcrop could be made with a width equal to the perimeter of the cylinder, before being transformed into a data array.

The present invention is described in terms of its preferred embodiment, being clear that modifications can be made to the matter described herein, such modifications being further included by the set of claims comprising this description.

The invention claimed is:

1. A method, the method comprising:

selecting a geological outcrop photographic image for definition of a borehole wall image profile in the geological outcrop photographic image;

cropping the geological outcrop photographic image to form an original crop;

duplicating and inverting the original crop to form an inverted crop;

joining the original crop to the inverted crop to form a new constructed image;

saving the new constructed image; and applying geophysical profile analysis to the saved new constructed image to define the borehole wall image profile.

2. The method, according to claim 1, wherein the selection of the geological outcrop photographic image comprises determining a base photographic image which longitudinal section of a photographic crop on the base photographic image will be transformed into a flat projection of a cylindrical pseudo profile.

3. The method, according to claim 1, wherein the selection of the geological outcrop photographic image occurs with the geological outcrop photographic image presenting expected dimensions of an outcrop photo crop for comparison with a borehole wall.

4. The method according to claim 1, wherein the selection of the geological outcrop photographic image occurs with geological structures under investigation visible in outcrop photographs to the naked eye on a computer display.

5. The method according to claim 1, wherein the selection of the geological outcrop photographic image occurs with a scale of the geological outcrop photographic image being known so that a crop of precise size and known dimensions can be made.

6. The method according to claim 1, wherein the selection of the geological outcrop photographic image occurs with a resolution being greater than 120 dpi.

7. The method, according to claim 1, wherein the cropping is carried out using a commercially available program of image visualization or vector illustration graphic design; and the original crop presents a width relative to half a perimeter of a wall of a borehole investigated.

8. The method, according to claim 1, wherein in the duplicating and inverting, sides of the original crop on a transverse axis are duplicated, mirroring the original crop.

9. The method, according to claim 1, wherein in the joining, a union of the original crop with the inverted crop is carried out from left to right or from right to left, achieving a flat projection of a cylindrical pseudo profile as the new constructed image.

10. The method, according to claim 1, wherein the new constructed image is saved in at least one of digital formats: jpg, tif, or png.

11. The method, according to claim 1, wherein the new constructed image is a flat projection of a pseudocylinder.

12. The method, according to claim 1, wherein the new constructed image is saved in a digital format.

13. The method, according to claim 1, wherein the original crop presents a width relative to half a perimeter of a wall of a borehole investigated.

14. The method, according to claim 1, wherein the geological outcrop photographic image is a two-dimensional photograph.

15. The method, according to claim 1, wherein the selecting comprises selecting the geological outcrop photographic image as one image among a plurality of geological outcrop photographic images imaging rock.

16. The method, according to claim 5, wherein the original crop has the precise size and known dimensions.

17. A method, the method comprising:

selecting a photograph imaging a borehole in rock from among a plurality of photographs imaging the borehole;

cropping the selected photograph to form a cropped image;

duplicating the cropped image to form a duplicate image;

mirroring the duplicate image longitudinally to form a mirrored image;

joining the cropped image to the mirrored image to form a new constructed image;

saving the new constructed image in a digital format; and applying geophysical profile analysis to the saved new constructed image to define a borehole wall image profile for the borehole.

18. The method, according to claim 17, wherein the cropped image presents a width relative to half a perimeter of a wall of the borehole.

19. The method, according to claim 17, wherein the new constructed image is a flat projection of a pseudocylinder;

the applying of the geophysical profile analysis comprises loading the saved new constructed image into a commercially available geophysical profile analysis intelligence mechanism including a module that converts the flat projection of the pseudocylinder into arrays with RGB values; and the flat projection of the pseudocylinder converted into the arrays of RGB values is capable of being recognized in intelligence mechanisms that have a capacity for petrophysical interpretation, as the flat projection of the pseudocylinder presents a same format as an image profile, as well as being capable of being viewed with a same color scale and being rotated horizontally, in relation to a position of a cylinder wanted to observe, between 0° and 360°.

20. The method, according to claim 11, wherein the applying of the geophysical profile analysis comprises loading the saved new constructed image into a commercially available geophysical profile analysis intelligence mechanism including a module that converts the flat projection of the pseudocylinder into arrays with RGB values; and the flat projection of the pseudocylinder converted into the arrays of RGB values is capable of being recognized in intelligence mechanisms that have a capacity for petrophysical interpretation, as the flat projection of the pseudocylinder presents a same format as an image profile, as well as being capable of being viewed with a same color scale and being rotated horizontally, in relation to a position of a cylinder wanted to observe, between 0° and 360°.

* * * * *